United States Patent
Huang

(10) Patent No.: US 11,252,931 B2
(45) Date of Patent: Feb. 22, 2022

(54) METHOD OF HEALTH MANAGEMENT FOR A SELF-CLEANING CAT LITTER BOX AND RELATED DEVICE

(71) Applicant: MoDoDo Co. Ltd., Taipei (TW)

(72) Inventor: Chia-Ho Huang, Taichung (TW)

(73) Assignee: MoDoDo Co. Ltd., Taipei (TW)

(*) Notice: Subject to any disclaimer, the term of this patent is extended or adjusted under 35 U.S.C. 154(b) by 435 days.

(21) Appl. No.: 16/435,540

(22) Filed: Jun. 9, 2019

(65) Prior Publication Data
US 2020/0383295 A1    Dec. 10, 2020

(51) Int. Cl.
| | | |
|---|---|---|
| *A01K 1/01* | (2006.01) | |
| *G01G 23/42* | (2006.01) | |
| *G01G 19/52* | (2006.01) | |
| *A01K 29/00* | (2006.01) | |

(52) U.S. Cl.
CPC ............ *A01K 1/011* (2013.01); *A01K 29/005* (2013.01); *G01G 19/52* (2013.01); *G01G 23/42* (2013.01)

(58) Field of Classification Search
CPC .... A01K 1/011; A01K 1/0114; A01K 1/0107; A01K 29/005; A01K 23/005; G01G 19/52; G01G 23/42
USPC ........ 119/163, 166, 161, 421, 164, 165, 174
See application file for complete search history.

(56) References Cited

U.S. PATENT DOCUMENTS

| | | | | |
|---|---|---|---|---|
| 5,662,066 A | * | 9/1997 | Reitz .................... | A01K 1/0114 119/163 |
| 6,041,737 A | * | 3/2000 | Hennigan ............ | A01K 1/0107 119/161 |
| 7,017,519 B1 | * | 3/2006 | Deasy .................... | A01K 1/011 119/166 |
| 8,307,785 B2 | * | 11/2012 | Zimmerman ........ | A01K 5/0225 119/51.02 |
| 8,746,178 B2 | * | 6/2014 | Greene ................ | A01K 5/0114 119/421 |
| 8,797,166 B2 | * | 8/2014 | Triener ................ | A01K 29/005 340/573.1 |
| 10,463,023 B2 | * | 11/2019 | Perez-Camargo ... | A01K 1/0152 |
| 2007/0227457 A1 | * | 10/2007 | Waters ................ | A01K 1/0114 119/166 |
| 2009/0241850 A1 | * | 10/2009 | Campbell ............ | A01K 1/0117 119/164 |
| 2013/0333625 A1 | * | 12/2013 | Baxter .................. | A01K 1/011 119/166 |

* cited by examiner

*Primary Examiner* — Yvonne R Abbott-Lewis
(74) *Attorney, Agent, or Firm* — Winston Hsu

(57) ABSTRACT

A method of health management for a self-cleaning cat litter box is disclosed. The method comprises measuring a first weight of the self-cleaning cat litter box, measuring a second weight of the self-cleaning cat litter box in responsive to a cat entering the self-cleaning cat litter box, identifying the cat entering the self-cleaning cat litter box, measuring a third weight of the self-cleaning cat litter box after the cat leaves the self-cleaning cat litter box, measuring a fourth weight of the self-cleaning cat litter box after the self-cleaning cat litter box performs waste cleaning, and uploading the identified cat with a body weight, a waste weight, and a waste type according to weight differences among the first, second, third and fourth weights.

14 Claims, 4 Drawing Sheets

METHOD OF HEALTH MANAGEMENT FOR A SELF-CLEANING CAT LITTER BOX AND RELATED DEVICE

BACKGROUND OF THE INVENTION

1. Field of the Invention

The present disclosure relates to a self-cleaning cat litter box, and more particularly, to a method of health management utilized in a self-cleaning cat litter box.

2. Description of the Prior Art

Cats are usually trained to use a litter box for elimination of both liquid and solid wastes. Most cat owners take appropriate action to discard the litter from a cat litter box after an appreciable period of time, often several days. On the other hand, even before the litter has been thoroughly saturated with waste from the cat or cats that use it, a cat may be inclined to push some of the litter out of the box, particularly if the odor is strong. In any event, the person using a cat litter box may find the task of emptying the cat litter to be unpleasant. Thus, a number of devices have been proposed for cleaning cat litter boxes.

The self-cleaning cat litter box is introduced, which utilizes a rake or comb that is normally maintained in a storage position at one end of the litter chamber. At predetermined intervals, the comb is moved through the litter, from the end of the litter chamber to the opposite end, so as to move any clumps collected by the comb into a disposal receptacle. Unfortunately, because cats are not consistent in their elimination habits, such periodic clearing may be too frequent, or not frequent enough.

A new self-cleaning cat litter box is therefore applied with moving a comb or rake through the litter responsive to entry and exit of the cat from the litter box. However, those conventional self-cleaning litter boxes do not provide further functionality other than automatically litter cleaning.

SUMMARY OF THE INVENTION

It is therefore an objective to provide a method of health management for a self-cleaning cat litter box to solve the above problem.

The present invention discloses a method of health management for a self-cleaning cat litter box. The method comprises measuring a first weight of the self-cleaning cat litter box, measuring a second weight of the self-cleaning cat litter box in responsive to a cat entering the self-cleaning cat litter box, identifying the cat entering the self-cleaning cat litter box, measuring a third weight of the self-cleaning cat litter box after the cat leaves the self-cleaning cat litter box, measuring a fourth weight of the self-cleaning cat litter box after the self-cleaning cat litter box performs waste cleaning, and uploading the identified cat with a body weight, a waste weight, and a waste type according to weight differences among the first, second, third and fourth weights.

The present invention discloses a computing device for cat health management. The computing device comprises a processing unit for executing a program, and a storage unit coupled to the processing unit for storing the program, wherein the program instructs the processing unit to perform the following steps: measuring a first weight of the self-cleaning cat litter box, measuring a second weight of the self-cleaning cat litter box in responsive to a cat entering the self-cleaning cat litter box, identifying the cat entering the self-cleaning cat litter box, measuring a third weight of the self-cleaning cat litter box after the cat leaves the self-cleaning cat litter box, measuring a fourth weight of the self-cleaning cat litter box after the self-cleaning cat litter box performs waste cleaning, and uploading the identified cat with a body weight, a waste weight, and a waste type according to weight differences among the first, second, third and fourth weights.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
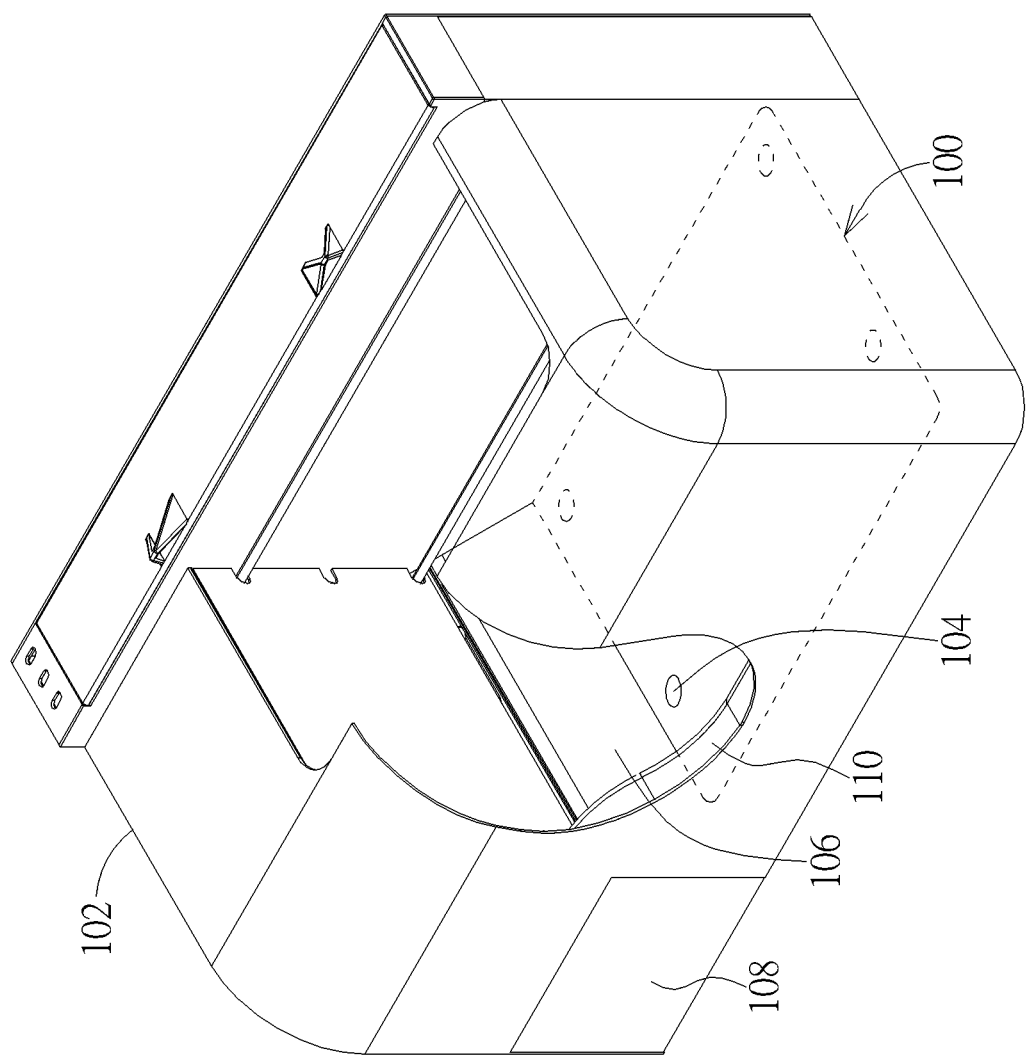
FIG. 1 is a schematic diagram of a self-cleaning litter box according to one embodiment of the present disclosure.

Reference is made to FIG. 1, which illustrate the self-cleaning cat litter box 10 that includes the litter box 100 and the cabin shell 102. The litter box 100 includes the load sensor 104 deployed in the bottom of the litter box 100 for measuring weight of the litter box 100, so as to detect whether a cat enters the self-cleaning cat litter box 10. Note that, the number of the load sensor 104 is not limited herein. In addition, the litter box 100 includes the comb 106 capable of moving from a storage position to a discharge position, for raking clumps of litter into the waste receptacle 108. After dumping the clumps of litter into the waste receptacle 108, the comb 106 automatically reverses direction to return to the storage position. In an example, the litter box 100 further includes the radio-frequency identification (RFID) reader 110 for identity check.

Figure 2:
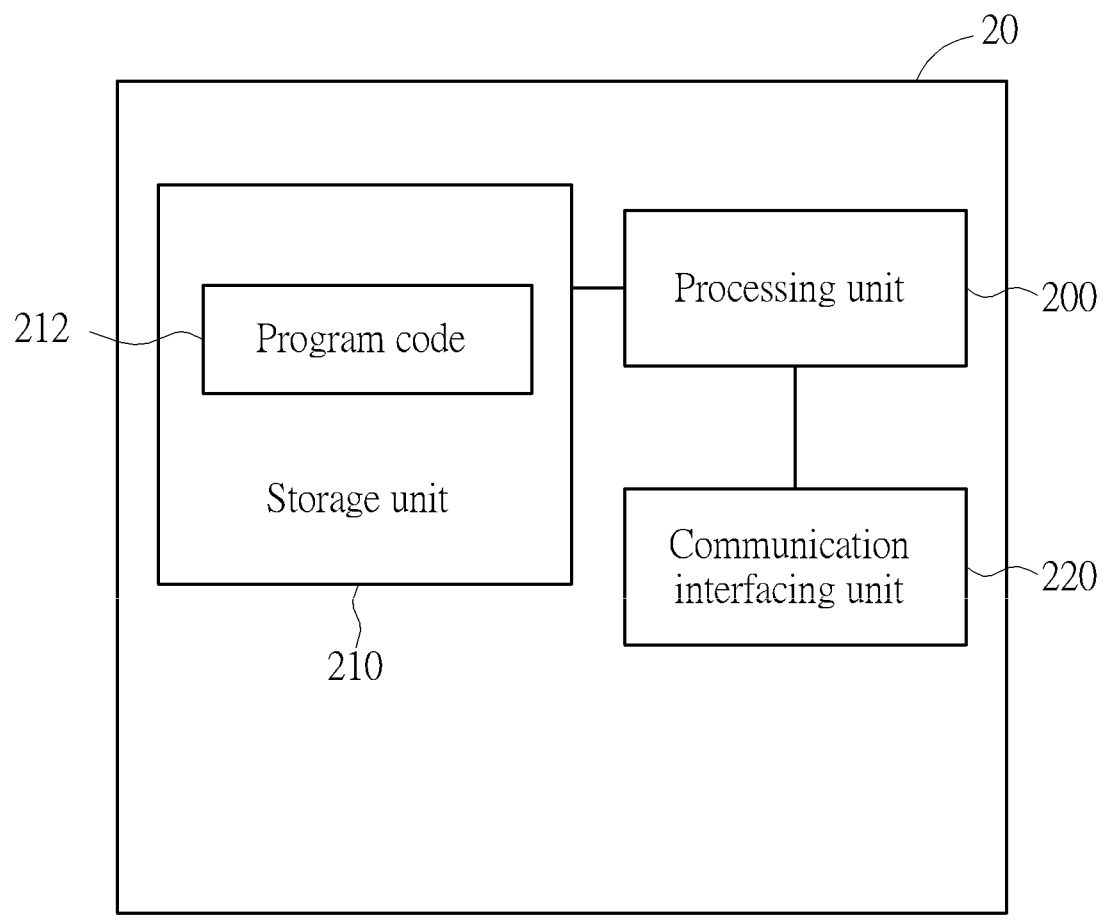
FIG. 2 is a schematic diagram of a computing device according to an embodiment of the present disclosure.

FIG. 2 is a schematic diagram of a computing device 20 according to one embodiment of the present disclosure. The computing device is applied in the self-cleaning cat litter box 10, and includes a processing unit 200, such as a microprocessor or Application Specific Integrated Circuit (ASIC), a storage unit 210 and a communication interfacing unit 220. The storage unit 210 may be any data storage device that can store a program code 214, for access by the processing unit 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is applied with a wire or wireless communication for exchange signals with an user equipment, e.g. a mobile phone, ora cloud device.

Figure 3:
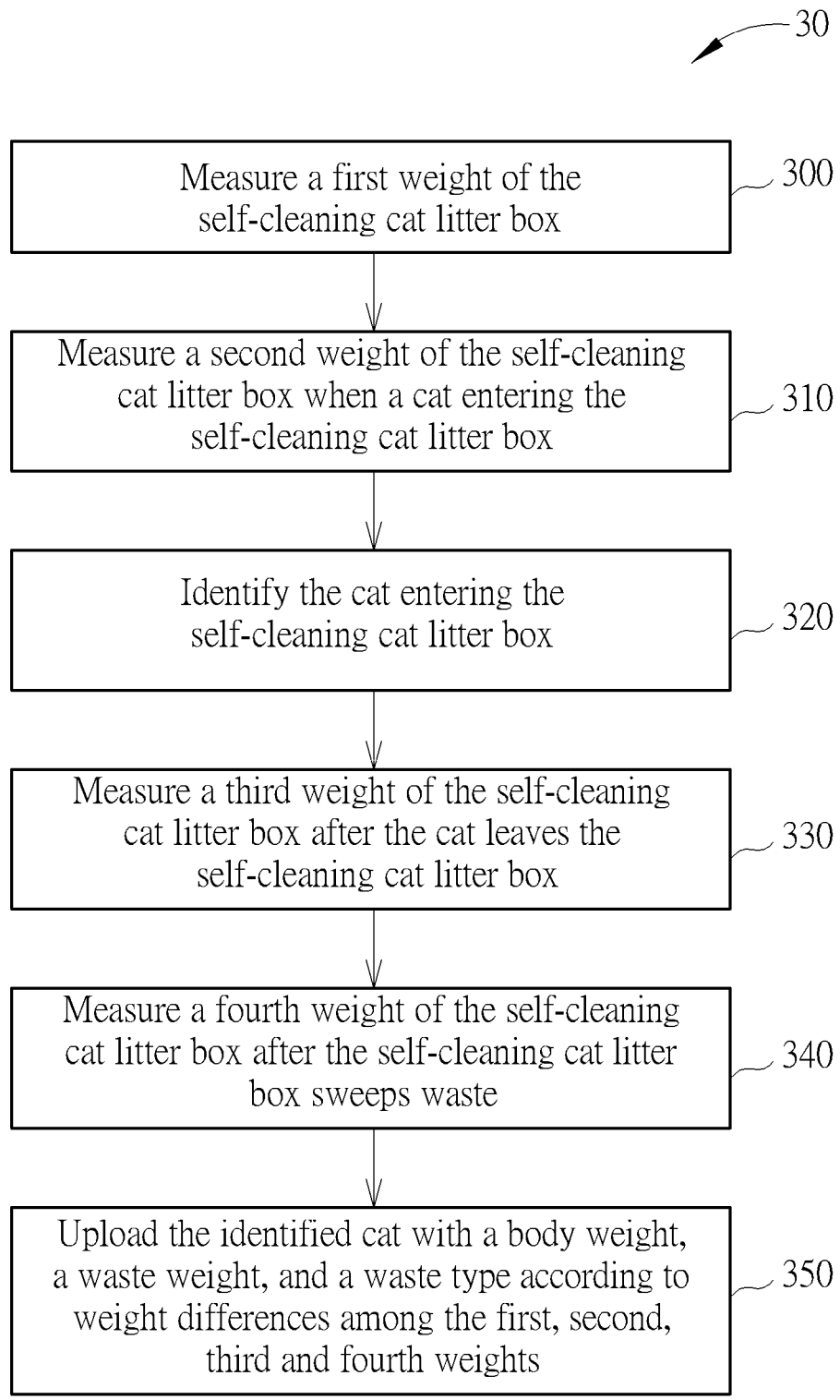
FIG. 3 is a flowchart according to an embodiment of the present disclosure.

Reference is made to FIG. 3. A flowchart of a process 30 according to an embodiment of the present disclosure is illustrated. The process 30 could be utilized in the computing device 20 of FIG. 2 for cat health management. The process 30 may be compiled into a program code 214 to be stored in the storage unit 210, and may include the following steps:

Step 300: Measure a first weight of the self-cleaning cat litter box.

Step 310: Measure a second weight of the self-cleaning cat litter box in responsive to a cat entering the self-cleaning cat litter box.

Step 320: Identify the cat entering the self-cleaning cat litter box.

Step 330: Measure a third weight of the self-cleaning cat litter box after the cat leaves the self-cleaning cat litter box.

Step 340: Measure a fourth weight of the self-cleaning cat litter box after the self-cleaning cat litter box sweeps waste.

Step 320: Upload the identified cat with a body weight, a waste weight, and a waste type according to weight differences among the first, second, third and fourth weights.

According to the process 30, the self-cleaning cat litter box 10 reports health information about cat's body weight, waste weight, and waste type to the owner via the user equipment, such as mobile application, APP. In an example, the self-cleaning cat litter box 10 may record the health information of cats in the storage unit 210, or may send the health information to the cloud device for storage. Thus, the self-cleaning cat litter box 10 is not only used for automatically litter cleaning, but also providing health management functionality, such that the owner can apply proper healthcare and medical treatment for the cat.

In detail, the processing unit 200 of the computing device 20 is connected with the load sensor 104, to obtain the weight of the litter box 100, and therefore determines which cat enters the self-cleaning cat litter box 10 according to a pre-stored database and the body weight of the cat, which is calculated by the difference in weight before and after the cat enters the self-cleaning cat litter box 10. The weight measured before the cat enters the self-cleaning cat litter box 10 is hereafter called initial weight, namely the weight of litter box 100 including cat litter. The pre-stored database includes the cats' profile names/identities and corresponding weights. Thus, the processing unit 200 of the computing device 20 can find the cat entering the self-cleaning cat litter box 10 by searching the mapped body weight from the pre-stored database. Note that, the weight data of the pre-stored database shall be periodically updated with machine learning, so as to correctly identify the cat entering the self-cleaning cat litter box 10 based on the weight of the cat without distortion. In addition, the pre-stored database could be stored in the cloud device or in the storage unit 210.

In other embodiments, the processing unit 200 of the computing device 20 is connected with the RFID reader 110, and determines which cat enters the self-cleaning cat litter box 10 based on the RFID reader, which confirms the cat's identity with the RFID chip or RFID tag carried on the cat.

In addition, after the cat is identified and leaves the self-cleaning cat litter box 10, the processing unit 200 of the computing device 20 obtains the weight of the litter box 100 including the waste by the load sensor 104, and indicates the self-cleaning cat litter box 10 to perform cleaning. The processing unit 200 further determines the waste type (i.e. urine/feces) according to the difference in weight before and after the self-cleaning cat litter box 10 performs litter cleaning. For example, normally the clumped urine is heavy than the feces, and thus the computing device 20 knows what kind of waste it is. Meanwhile, the computing device 20 calculates the waste weight according to the weight difference between the weight measured from that the cat leaves the self-cleaning cat litter box 10 and the initial weight of the self-cleaning cat litter box 10.

Moreover, in an embodiment, the processing unit 200 of the computing device 20 may obtain the usage time of that the cat stay in the self-cleaning cat litter box 10 by the load sensor 104. Thus, the computing device 20 is able to correctly determine the waste type based on the usage time and the waste weight. That is, the processing unit 200 of the computing device 20 takes how long the cat is in the self-cleaning cat litter box 10 into consideration for waste type determination.

Besides, the processing unit 200 of the computing device 20 estimates the remaining capacities of a litter supply tank (now shown in FIG. 1) and the waste receptacle 108 of the self-cleaning cat litter box 10 based on the waste type and the waste weight, and then reports the remaining litter supply capacity and waste receptacle capacity to the owner.

Figure 4:
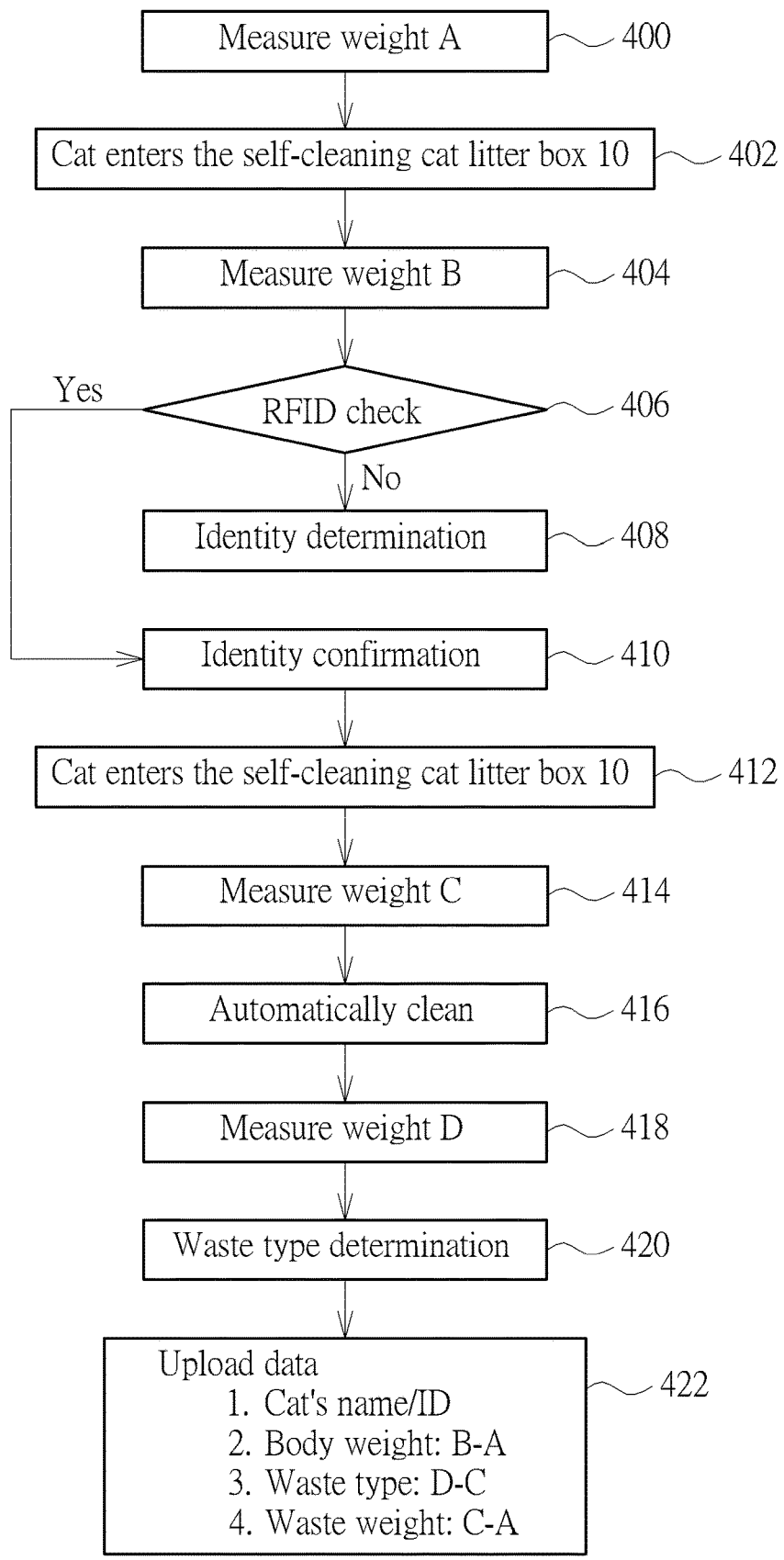
FIG. 4 is an operation of the self-cleaning litter box according to an embodiment of the present disclosure.

For detailed operation of the self-cleaning cat litter box 10, please refer to FIG. 4. The self-cleaning cat litter box 10 obtains the measured weight A including the litter box 100 and cat litter (step 400). A cat enters the self-cleaning cat litter box 10, and the weight B including the litter box 100, cat litter and the cat is measured (steps 402-404). The self-cleaning cat litter box 10 identifies the cat entering the self-cleaning cat litter box 10 by the RFID reader if the cat is carried with the RFID chip/tag (step 406). Otherwise, the self-cleaning cat litter box 10 identifies the cat by the cat's weight, which is obtained from weight B minus weight A, with the machine learning database (steps 408-410). After the cat left the self-cleaning cat litter box 10, the weight C of the litter box 100 including the cat litter and cat waste is measured (steps 412-414). The weight D of the litter box 100 is measured by the load sensor 104 after the self-cleaning cat litter box 10 performs the waste cleaning (steps 416-418). In addition, the self-cleaning cat litter box 10 determines the waste type (e.g. urine/feces) by the weight D minus weight C (step 420). Finally, the self-cleaning cat litter box 10 uploads the identified cat name, body weight, waste type and waste weight (calculated by weight C minus weight A) to the user equipment or could device (step 422).

Note that, the self-cleaning cat litter box 10 should include the initial cat's profile, which includes cat's name and weight, manually inputted by the owner. In addition, the self-cleaning cat litter box 10 should equipped machine learning tech to update weight data of the cats, to obtain recent weight of the cat with data training. Thus, the self-cleaning cat litter box 10 is able to predict which cat enters the self-cleaning cat litter box 10 accurately.

With such manner, the owner can observe the weight changes, usage times of the self-cleaning cat litter box 10, and waste weight for each cat, so as to realize cat health management. Thus, the owner can take proper medical care for their pets.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the self-cleaning cat litter box 10/computing device 20.

In conclusion, the present disclosure aims at providing a method of health management applied on the self-cleaning cat litter box 10. In detail, the identified cat with a body weight, a waste weight, and a waste type is uploaded for the owner or veterinary, and thus the self-cleaning cat litter box 10 is not designed only for waste cleaning, but also health management.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of health management used in a self-cleaning cat litter box, the method comprising:
   measuring a first weight of the self-cleaning cat litter box;
   measuring a second weight of the self-cleaning cat litter box in responsive to a cat entering the self-cleaning cat litter box;
   identifying the cat entering the self-cleaning cat litter box;
   measuring a third weight of the self-cleaning cat litter box after the cat leaves the self-cleaning cat litter box;
   measuring a fourth weight of the self-cleaning cat litter box after the self-cleaning cat litter box perform waste cleaning; and
   uploading the identified cat with a body weight, a waste weight, and a waste type according to weight differences among the first, second, third and fourth weights.

2. The method of claim 1, wherein the step of identifying the cat entering the self-cleaning cat litter box comprises:
   determining which cat entering the self-cleaning cat litter box according to a first weight difference between the first weight and the second weight with a pre-stored database including cats' profile name/identity and corresponding weights.

3. The method of claim 2, wherein the pre-stored database is stored in a cloud device connecting to the self-cleaning cat litter box or in a memory of the self-cleaning cat litter box.

4. The method of claim 3, wherein the step of uploading the identified cat with the body weight, the waste weight, and the waste type according to weight differences among the first, second, third and fourth weights comprises:
   uploading the identified cat with the body weight, the waste weight, and the waste type to the cloud device or the memory.

5. The method of claim 1, wherein the step of identifying the cat entering the self-cleaning cat litter box comprises:
   determining which cat entering the self-cleaning cat litter box according to a radio-frequency identification, RFID, chip or tag carried on the cat.

6. The method of claim 1, further comprising:
   determining a usage time of that the cat entering the self-cleaning cat litter box;
   determining the waste type according to a second weight difference between the third and fourth weights, and the usage time; and
   determining the waste weight according to a third weight difference between the first and third weights.

7. The method of claim 6, further comprising:
   estimating remaining capacities of a litter supply tank and a waste receptacle of the self-cleaning cat litter box based on the waste type and waste weight; and
   notifying the remaining capacities to an owner.

8. A self-cleaning cat litter box for health management, comprising:
   a load sensor, for measuring weight of the self-cleaning cat litter box; and
   a computing device, connecting to the load sensor, comprising:
   a processing unit for executing a program; and
   a storage unit coupled to the processing unit for storing the program; wherein the program instructs the processing unit to perform the following steps:
      obtaining a first weight of the self-cleaning cat litter box, from the load sensor;
      obtaining a second weight of the self-cleaning cat litter box in responsive to a cat entering the self-cleaning cat litter box, from the load sensor;
      identifying the cat entering the self-cleaning cat litter box;
      obtaining a third weight of the self-cleaning cat litter box after the cat leaves the self-cleaning cat litter box, from the load sensor;
      obtaining a fourth weight of the self-cleaning cat litter box after the self-cleaning cat litter box performs waste cleaning, from the load sensor; and
      uploading the identified cat with a body weight, a waste weight, and a waste type according to weight differences among the first, second, third and fourth weights.

9. The computing device of claim 8, wherein the step of identifying the cat entering the self-cleaning cat litter box comprises:
   determining which cat entering the self-cleaning cat litter box according to a first weight difference between the first weight and the second weight with a pre-stored database including cats' profile name/identity and corresponding weights.

10. The computing device of claim 9, wherein the pre-stored database is in a cloud device connecting to the self-cleaning cat litter box or in a memory of the self-cleaning cat litter box.

11. The computing device of claim 10, wherein the step of uploading the identified cat with the body weight, the waste weight, and the waste type according to weight differences among the first, second, third and fourth weights comprises:
   uploading the identified cat with the body weight, the waste weight, and the waste type to the cloud device or the memory.

12. The computing device of claim 8, wherein the step of identifying the cat entering the self-cleaning cat litter box comprises:
   determining which cat entering the self-cleaning cat litter box according to a radio-frequency identification, RFID, chip or tag carried on the cat.

13. The computing device of claim 8, further comprising:
   determining a usage time of that the cat entering the self-cleaning cat litter box;
   determining the waste type according to a second weight difference between the third and fourth weights, and the usage time; and
   determining the waste weight according to a third weight difference between the first and third weights.

14. The computing device of claim 13, further comprising:
   estimating remaining capacities of a litter supply tank and a waste receptacle of the self-cleaning cat litter box based on the waste type and waste weight; and
   notifying the remaining capacities to an owner.

* * * * *